United States Patent [19]
Ishizuka et al.

[11] Patent Number: 5,686,771
[45] Date of Patent: Nov. 11, 1997

[54] ELECTRIC MOTOR

[75] Inventors: Yutaka Ishizuka; Koichi Katakura, both of Nagano, Japan

[73] Assignee: Kabushiki Kaisha Sankyo Seiki Seisakusho, Nagano, Japan

[21] Appl. No.: 457,812

[22] Filed: Jun. 1, 1995

[30] Foreign Application Priority Data

Jun. 3, 1994 [JP] Japan ................................ 6-122622

[51] Int. Cl.$^6$ .................................................... H02K 7/08
[52] U.S. Cl. ................................... 310/90; 310/67 R
[58] Field of Search ............................. 310/67 R, 90, 310/156; 384/480, 517; 277/53, 55–57

[56] References Cited

U.S. PATENT DOCUMENTS

| | | | |
|---|---|---|---|
| 5,047,677 | 9/1991 | Mineta et al. | 310/67 R |
| 5,059,844 | 10/1991 | Anstine | 310/90 |
| 5,483,113 | 1/1996 | Sakuragi | 310/90 X |
| 5,552,650 | 9/1996 | Cap et al. | 310/67 R |

FOREIGN PATENT DOCUMENTS 5-276722  10/1993  Japan ................. H02K 21/22

*Primary Examiner*—Mark O. Budd
*Attorney, Agent, or Firm*—Sughrue,Mion,Zinn,Macpeak & Seas, PLLC

[57] ABSTRACT

In an electric motor, its motor frame has a shaft hole, a shaft is fitted in the shaft hole in such a manner that its one end potion is in the shaft hole while the other end portion is extended outside the motor frame. The motor frame includes a bearing-receiving portion extended therefrom in such a manner that the bearing-receiving portion confronts with the inner race of a rolling bearing fitted on the end portion of the shaft, and has a wall surface which merges with the wall surface of the shaft hole. The shaft has a groove which is covered by a part of the inner cylindrical surface of the inner race of the ball bearing and by the wall surface of the protruded portion. The inner raced is fixedly secured to the shaft with adhesive.

4 Claims, 2 Drawing Sheets

ELECTRIC MOTOR

BACKGROUND OF THE INVENTION

1. Field of the Invention

This invention relates to an electric motor employing a rolling bearing.

2. Related Art

FIG. 3 shows a magnetic disk driving motor 9 which is provided for a magnetic disk device adapted to record data in a magnetic disk and to reproduce them therefrom.

The motor 9 has a motor frame 1 including a protruded portion 1a, on which a core 2 with a plurality of protruded poles is mounted. A coil assembly 3 is wound, a predetermined number of turns, on the protruded poles of the core 2.

The protruded portion 1a of the motor frame 1 has a shaft hole 1b, in which one end portion 4b of a shaft 4 is fitted with the other end portion 4a extended outside.

A pair of rolling bearings, namely, ball bearings 5 and 6 are fitted on the end portion 4a of the shaft 4 with a predetermined distance between them, so that the rotor 7 is rotatably supported through the bearings 5 and 6 on the shaft 4.

Driving magnets 8 are fixedly mounted on the inner cylindrical surface of the rotor 7 in such a manner that they are confronted with the core 2.

Annular grooves 4c and 4d are formed, as adhesive pools, in the cylindrical surface of the shaft 4 in such a manner that they confront the inner cylindrical surfaces of the inner races 5a and 6a of the ball bearings 5 and 6, respectively.

Roughly stated, the motor 9 thus designed is assembled as follows: The core 2, on the protruded poles of which the coil assembly 3 has been wound, is mounted on the protruded portion 1a of the motor frame 1, and then the end portion 4b of the shaft 4 is inserted in the shaft hole 1b. Next, with an adhesive (not shown) applied to the annular grooves 4c of the shaft 4, the ball bearings 5 and 6 are fitted from an upper end on the latter 4. Under this condition, the rotor 7, on which the driving magnets 8 have been fixedly mounted, is fitted on the outer races 5b and 6b of the ball bearings 5 and 6.

The above-described conventional electric motor 9 suffers from the following difficulties: The adhesive for fixing the inner race 6a of the ball bearing 6 to the shaft 4 is held in the grooves 4c and 4d; that is, it is not allowed to flow down from the groove 4c. However, when the ball bearing 6 is fitted on the shaft 4, an excess of adhesive is caused to flow over the groove 4d, thus entering the ball bearing 6.

The adhesive thus caused to flow over the groove 4d adversely affects the ball bearing 6, so that the latter 6 cannot work satisfactorily any longer; that is, it is greatly lowered in reliability. In order to overcome this difficulty, it is necessary to accurately control the amount of adhesive applied to the groove 4c. However, this control will increase the manufacturing cost of the motor.

SUMMARY OF THE INVENTION

Accordingly, an object of the invention is to eliminate the above-described difficulties accompanying a conventional electric motor. More specifically, an object of the invention is to provide an electric motor which is higher in reliability and in work efficiency than the conventional electric motor.

According to an aspect of the present invention, there is provided an electric motor comprising: a motor frame having a shaft hole; a shaft having one end potion of which is inserted in said shaft hole and the other end portion extended outside said motor frame; and a rolling bearing having an inner race which is fitted on said other end portion of said shaft and fixed thereto with adhesive; a bearing-receiving portion extended from said motor frame in such a manner that said bearing-receiving portion confronts said inner race of said rolling bearing and has a wall surface which merges with the wall surface of said shaft hole; and a groove provided in said shaft, said groove being covered by a part of the inner cylindrical surface of said inner race of said ball bearing and by said wall surface of said bearing-receiving portion.

As was described above, even if a little too much adhesive is applied to the groove, no trouble occurs with the bearing. Accordingly, it is unnecessary to strictly limit the amount of adhesive applied to the groove, which improves the work efficiency in the application of adhesion.

BRIEF DESCRIPTION OF THE DRAWINGS

FIG. 1 (B) is an enlarged diagram showing essential components of the electric motor shown in FIG. 1 (A);

DETAILED DESCRIPTION OF THE PREFERRED EMBODIMENTS

Preferred embodiments of the invention will be described with reference to FIGS. 1 and 2.

FIRST EMBODIMENT

Figure 1A:
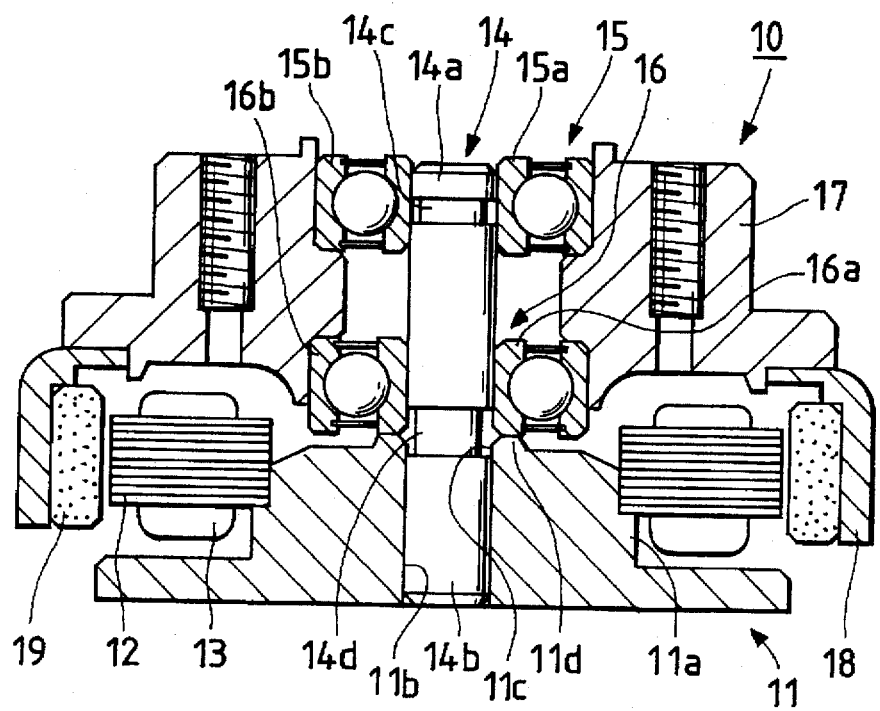
FIG. 1 (A) is a vertical sectional view of an example of an electric motor, which constitutes a first embodiment of the invention.
Figure 1B:
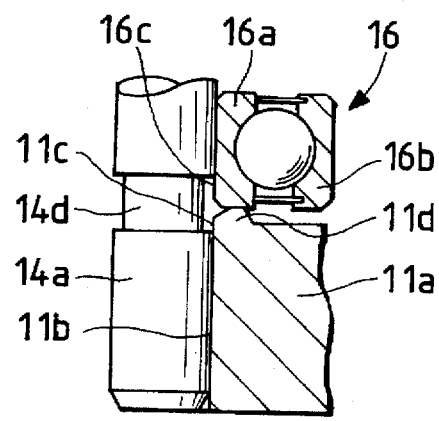

FIG. 1 (A) shows a magnetic disk driving motor 10, which constitutes a first example of the invention. The magnetic disk driving motor 10, as shown in FIG. 1 (A), has a disk-shaped motor frame 11 having a protruded portion 11a, on which a core 12 having a plurality of protruded poles is fitted. A coil assembly 13 is wound, a predetermined number of turns, on the protruded poles of the core 12.

The protruded portion 11a of the motor frame 11 has a shaft hole 11b, in which one end portion 14b of a shaft 14 is fitted with the other end portion 14a extended outside.

A pair of rolling bearings, namely, a pair of ball bearings 15 and 16 are fitted on the end portion 14a of the shaft 14. More specifically, the inner races 15a and 16a of the ball bearings 15 and 16 are fitted on the end portion 14a of the shaft 14 and secured thereto with adhesive, while the outer races 15b and 16b are fitted in a hub 17.

A yoke 18 is fixedly mounted on the hub 17, and driving magnets 19 are fixedly mounted on the inner cylindrical surface of the yoke 18 in such a manner that they confront the core 12.

An annular bearing-receiving portion 11d is extended from the protruded portion 11a of the motor frame 11 in such a manner that its inner wall surface 11c merges with the wall surface of the shaft hole 11b.

The outer end face of the annular bearing-receiving portion 11d abuts against the end face of the inner race 16a of the ball bearing 16, which is set closer to the protruded portion 11a than the other ball bearing 15, so as to position the ball bearing 16.

An upper annular groove 14c is formed, as an adhesive pool, in the cylindrical surface of the shaft 14 in such a manner that it is covered by the inner race 15a of the ball bearing 15. In addition, as shown in FIG. 1 (B), too, a lower annular groove 14d is formed, as an adhesive pool, in the cylindrical surface of the shaft 14 in such a manner that it is covered by both the inner surface 16c of the inner race 16a of the ball bearing 16 and the wall inner surface 11c of the bearing-receiving portion 11d which merges with the wall surface of the shaft hole 11b.

Roughly stated, the motor 10 thus designed is assembled as follows: First, the end portion 14b of the shaft 14 is fitted in the shaft hole 11b, and then the core 12, on the protruded poles of which the coil assembly 13 has been wound as required, is fitted on the protruded portion 11a of the motor frame 11.

Next, adhesive (not shown) is applied to the upper annular groove 14c, and then the ball bearing 16 is fitted on the shaft 14, and it is positioned when the end face of its inner race is abutted against the bearing-receiving portion 11d.

When the inner race 16a of the ball bearing 16a fitted on the shaft 14 passes over the upper annular groove 14c, the adhesive in the latter 14c sticks onto the inner race 16a, thus occupying the small gap between the inner race 16a and the shaft 14. Thus, the inner race 16a of the ball bearing 16 is fixedly secured to the shaft 14.

Similarly, the ball bearing 15 is fitted on the shaft 14. The ball bearing 15 is so positioned that its inner race 15a covers the upper annular groove 14c of the shaft 14.

In this operation, a part of the inner race 15a passes over the annular groove 14c. Hence, the adhesive in the latter 14c sticks onto the inner race 15, thus occupying the small gap between the inner race 15a and the shaft 14. Thus, the inner race 15a of the ball bearing 15 is fixedly secured to the shaft 14.

As is well known in the art, the ball bearings 15 and 16, which are rolling bearings, are fixed on the shaft 14 with a load (suitably approximated for the ball bearings) applied to the ball bearings 15 and 16 in a predetermined direction; in other words, the ball bearings 15 and 16 are fixed on the shaft 14 under the condition that they are preloaded.

The application of preload to each of the ball bearings in this way is to position the ball bearing accurately both in a radial direction and in an axial direction, and to increase the rigidity of the ball bearing, and to stabilize the raceway track of the ball bearing thereby to improve the accuracy of rotation.

The amount of preload applied to the ball bearing is set to a suitable value which is determined with the conditions in use of the ball bearing and the purpose of the application of preload to the ball bearing taken into account.

After the inner races 15a and 16a of the ball bearings 15 and 16 have been fixedly positioned in place, the hub 17, on which the yoke 18 and the driving magnets 19 have been mounted, is fitted on the outer races 15b and 16b.

In this operation, the ball bearing 16 is positioned with the inner race 16a abutted against the bearing-receiving portion 11d, while an excess of adhesive left near the end face of the inner race 16 is collected in the annular groove 14d which is partially covered by the wall surface 11c. Hence, no adhesive is allowed to enter the ball bearing 16.

Accordingly, the performance of the ball bearing 16 will never be lowered by the adhesive strength of the adhesive, and the resultant motor 10 is high in reliability.

Figure 3:
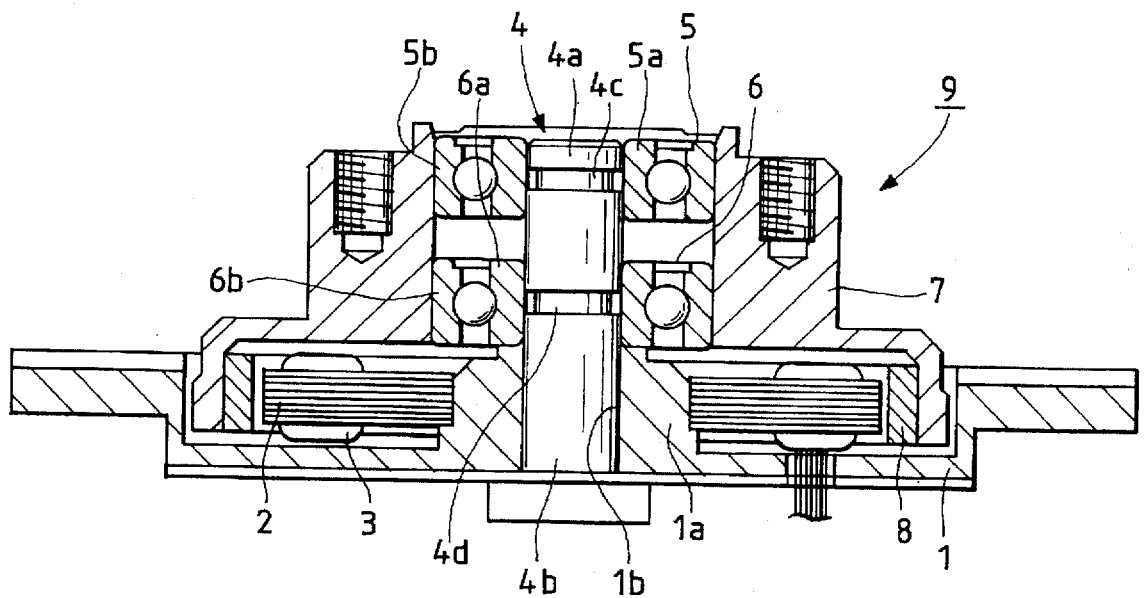
FIG. 3 is a vertical sectional view showing a conventional electric motor.

The annular groove 14d is larger in volume than the conventional one 4d (FIG. 3). Hence, even if a little too much adhesive (more than required for fixing the inner race 16a onto the shaft 14) is applied to the annular groove 14c, no trouble occurs with the bearing. That is, it is unnecessary to strictly limit the amount of adhesive to be applied to the annular groove, which improves the work efficiency in the application of adhesion as much.

The current flowing in the coil assembly 13 and the magnetic force of the driving magnets 19 act in combination to turn the hub 17 on which the yoke 18 and the driving magnets 19 are mounted, thereby to turn the magnetic disk placed on the hub 17.

SECOND EMBODIMENT

Figure 2:
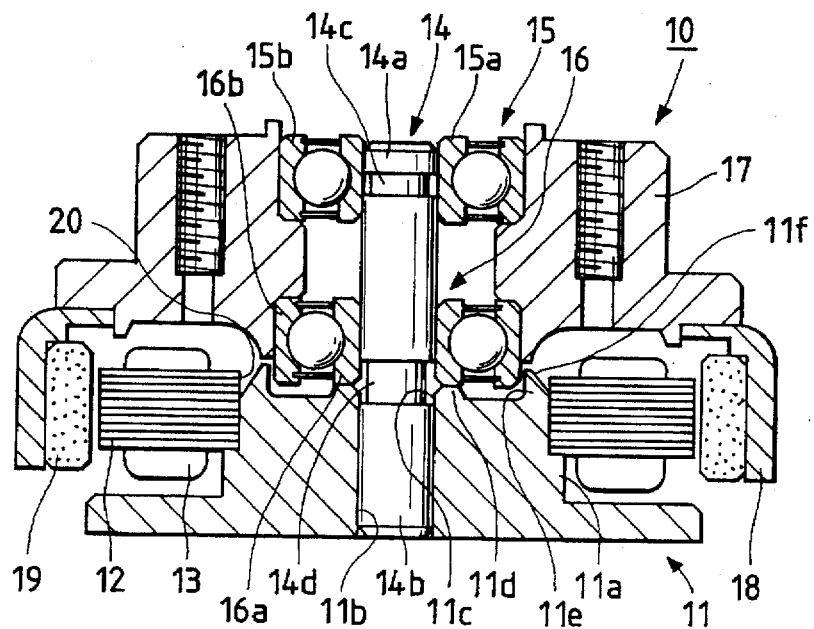
FIG. 2 is a vertical sectional view of another example of the electric motor, which constitutes a second embodiment of the invention.

Another example of the electric motor, which constitutes a second embodiment of the invention, is as shown in FIG. 2, in which parts corresponding functionally to those which have been described with reference to FIG. 1 are therefore designated by the same reference numerals or characters. A feature of the second embodiment resides in that the motor has a labyrinth structure.

That is, a cylindrical protrusion 11e is extended from the periphery of the protruded portion 11a of the motor frame 11 in such a manner that a predetermined gap (for instance of 0.2 mm) is formed between the cylindrical protrusion 11e and the outer race 16b of the ball bearing 16, thus providing a labyrinth structure for sealing oil mist and dust.

The cylindrical protrusion 11e may have tapered surface 20.

As was described above, in the electric motor of the invention, the motor frame includes the bearing-receiving portion extended therefrom in such a manner that the bearing-receiving portion confronts with the inner race of the rolling bearing and has the inner wall surface which merges with the wall surface of the shaft hole, and the shaft has the groove which is covered both by a part of the inner cylindrical surface of the inner race of the ball bearing and by the inner wall surface of the bearing-receiving portion.

Hence, even if a little too much adhesive is applied to the groove to fix the inner race to the shaft, it is collected in the groove which is laid under the inner wall surface of the bearing-receiving portion, thus not entering the rolling bearing; that is, the performance of the latter is not lowered by the adhesive strength of the adhesive. Thus, the resultant motor is high in reliability.

As was described above, even if a little too much adhesive is applied to the groove, no trouble occurs with the bearing. Accordingly, it is unnecessary to strictly limit the amount of adhesive applied to the groove, which improves the work efficiency in the application of adhesion.

What is claimed is:

1. An electric motor comprising:

a motor frame having a shaft hole;

a shaft having one end portion of which is inserted in said shaft hole and the other end portion extended outside said motor frame; and a rolling bearing having an inner race which is fitted on said other end portion of said shaft and fixed thereto with adhesive;

a bearing-receiving portion extended from said motor frame in such a manner that said bearing-receiving portion confronts said inner race of said rolling bearing and has an inner wall surface which merges with a wall surface of said shaft hole; and a grooved provided in said shaft, said groove being covered by a part of an inner cylindrical surface of said inner race of said roller bearing and by said inner wall surface of said bearing-receiving portion.

2. An electric motor as claimed in claim 1, wherein said motor frame includes a cylindrical protrusion formed thereon in such a manner that a predetermined distance is provided between said cylindrical protrusion and the outer cylindrical surface of the outer race of said rolling bearing.

3. An electric motor as claimed in claim 1, wherein an end surface of the inner race of said rolling bearing contacts said bearing-receiving portion.

4. An electric motor comprising:

a motor frame having a shaft hole;

a shaft having one end fixed to said shaft hole and an annular groove at a portion projected from said motor frame; and a roller bearing having an inner race, said inner race fixed to said shaft to cover said annular groove, wherein said inner race of said roller bearing contacts said frame so as to communicate the inner wall of said shaft hole with the inner circumferential surface of said inner race, and said annular groove is covered by a portion of the inner wall of said shaft hole and the inner circumferential surface of said inner race of said roller bearing.

* * * * *